C. ROBERTSON AND L. LAUPOT.
APPARATUS FOR MAKING CHAIN LINKS.
APPLICATION FILED SEPT. 10, 1919.
1,393,041.
Patented Oct. 11, 1921.
2 SHEETS—SHEET 2.
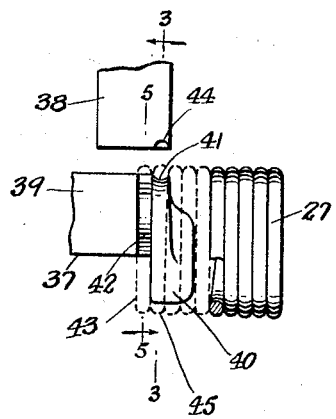
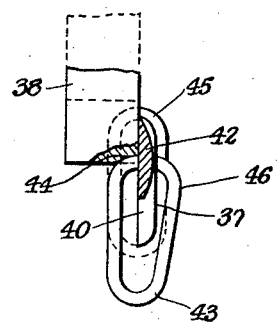
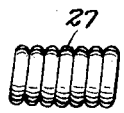
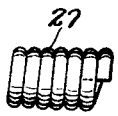
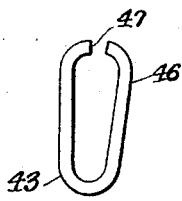
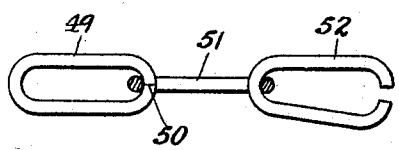
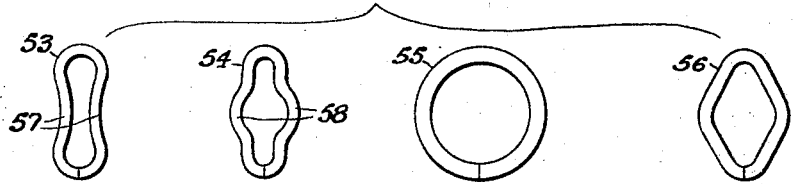
Inventors
Charles Robertson
Louis Laupot
By their Attorneys

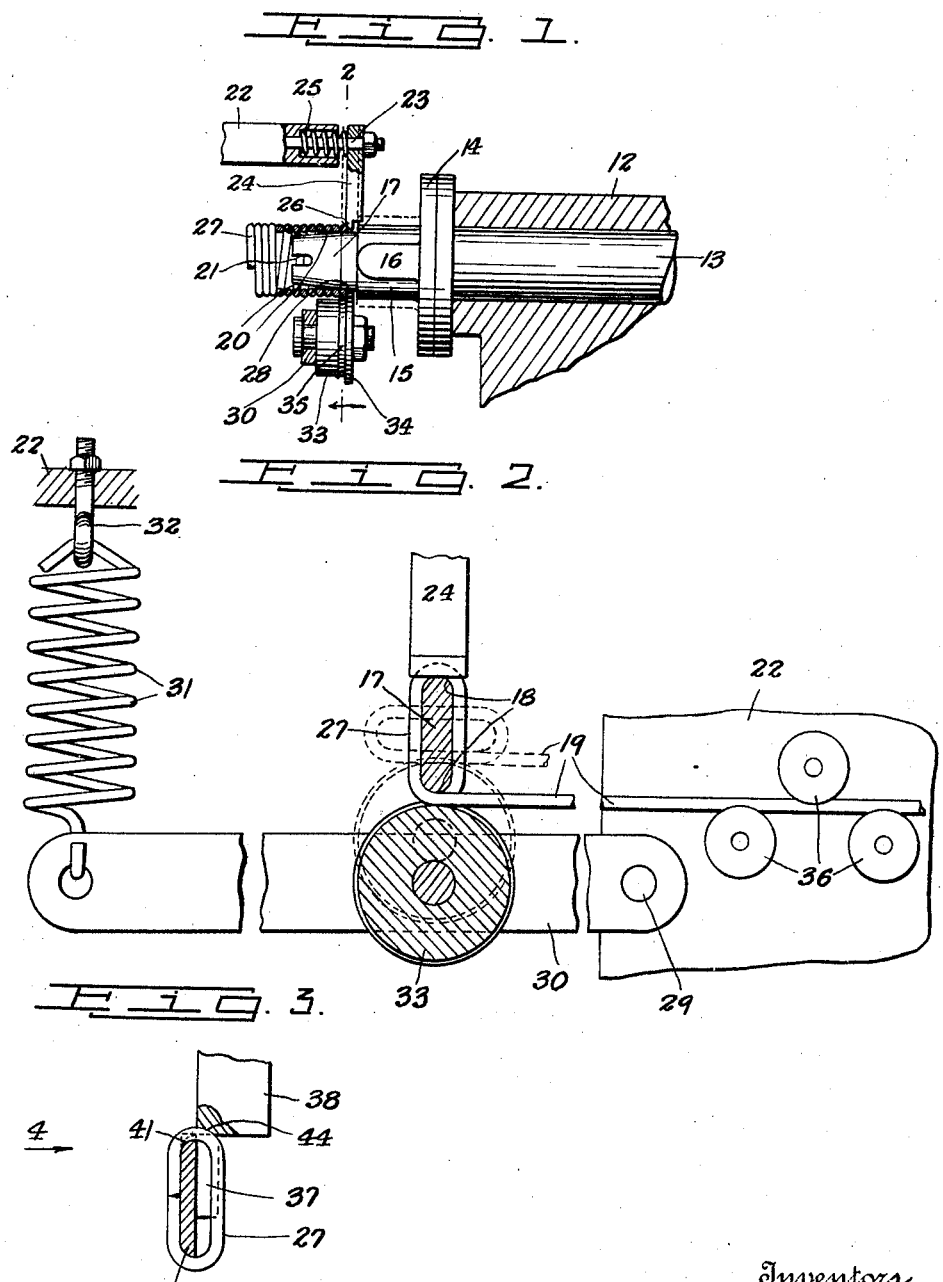

UNITED STATES PATENT OFFICE.

CHARLES ROBERTSON AND LOUIS LAUPOT, OF STROUDSBURG, PENNSYLVANIA, ASSIGNORS TO UNIVERSAL CHAIN CO., INC., OF STROUDSBURG, PENNSYLVANIA, A CORPORATION OF PENNSYLVANIA.

APPARATUS FOR MAKING CHAIN-LINKS.

1,393,041. Specification of Letters Patent. Patented Oct. 11, 1921.

Application filed September 10, 1919. Serial No. 322,813.

*To all whom it may concern:*

Be it known that we, CHARLES ROBERTSON and LOUIS LAUPOT, citizens of the United States, and residing at Stroudsburg, in the county of Monroe and State of Pennsylvania, have invented certain new and useful Improvements in Apparatus for Making Chain-Links, of which the following is a specification, such as will enable those skilled in the art to which it appertains to make and use the same.

This invention relates to an improved apparatus for manufacturing link chains and particularly chain constructions used for the purpose of supporting electric-light and other fixtures; and the object of the invention is to so simplify the manufacturing of chains of the class specified as to materially decrease the cost of production and yet produce a perfectly constructed link chain; a further object being to provide a simple and efficient apparatus for carrying our invention into effect; and with these and other objects in view the invention consists in the apparatus for manufacturing link chains as hereinafter set out.

The invention is fully disclosed in the following specification, of which the accompanying drawings form a part, in which the separate parts of our improvement are designated by suitable reference characters in each of the views, and in which:—

Figure 1 is a diagrammatic sectional side view of a part of a machine which we employ in the manufacture of link chains according to our method;

Fig. 2 is a partial section on the line 2—2 of Fig. 1 and on an enlarged scale, with parts of the construction broken away and in section;

Fig. 3 a sectional detail view of the cutting means employed for severing the separate links of the chains, the section being on the line 3—3 of Fig. 4;

Fig. 4 a view looking in the direction of the arrow 4 of Fig. 3 with parts in a different position and with parts broken away and in section;

Fig. 5 a partial section on the line 5—5 of Fig. 4 and showing parts in a different position;

Figs. 6 and 7 are edge views illustrating parts of a coil or spring from which the separate link members are detached;

Fig. 8 an edge view of one of the link members detached;

Fig. 9 a side view of the link member shown in Fig. 8;

Fig. 10 a view showing the method of joining the separate link members together to form a chain; and, Fig. 11 a view showing four modified forms of links which may be made according to our invention.

In Figs. 1 and 2 of the drawings, we have diagrammatically illustrated a part of a machine or mechanism, which forms or produces the first step in the process of manufacturing link chains, and in Fig. 1 we have shown at 12 the framework of a suitable machine in which a shaft 13 is rotatably mounted, said shaft being driven by any suitable means not shown. On the inner end of the shaft is mounted a flanged member 14, the cylindrical portion 15 of which is provided on opposite sides with two cam members 16, one of which is shown in full lines in Fig. 1. To the face of the cylindrical portion 15 is secured a mandrel 17 which is elongated in form in cross section, and the opposite side edges of which are rounded as shown at 18 to form an approximately elliptical section upon which a rod or wire 19 is adapted to be wound.

The rounded edges 18 of the mandrel are tapered outwardly as shown at 20 to permit the rod or wire which is wound on the mandrel in the same fashion as the winding of a spring to slip off, or be released from the mandrel. The outer edge of the mandrel is provided with an aperture 21 in which the free end of the rod or wire 19 is placed in the beginning of the operation of winding the rod or wire 19 on said mandrel.

In Fig. 1 we have shown at 22 a part of a supplemental framework in which is mounted a pin 23 on the outer end of which is secured a release arm 24 normally extended by a spring 25, and which is adapted to be moved against the tension of said spring by the cam members 16 on the cylindrical portion 15 of the flanged member 14. The free end of the arm 24 is cut out and beveled as shown at 26 to engage the innermost part of the rod or wire 19 wound upon the mandrel 17, and to move said part outwardly at every half revolution of the mandrel to release the spring or coil of wire 27 from said mandrel, or the approximately straight portion 28 thereof.

In Fig. 2 of the drawing, we have shown parts of the supplemental framework 22 and to one of these parts is pivoted, as shown at 29, an arm 30 to the free end of which is secured a spring 31, which normally tends to move said arm upwardly. The tension of the spring 31 is adjusted through a hook or loop device 32 adjustably mounted in another part of the supplemental frame 22. Rotatably mounted on the arm 30 between the pivot and free ends thereof is a roller die 33 having an enlarged flange 34 inwardly of which is an annular groove 35 in which the rod or wire 19 operates as clearly shown in Figs. 1 and 2, this roller die serves to hold the rod or wire in connection with the mandrel 17, as the mandrel rotates, thus fashioning the rod or wire about the mandrel to conform with the particular shape of said mandrel in cross-section and to form in the construction shown elongated loops, or the endless elongated loop-shaped coil or spring 27. It will be understood that the tension of the spring 31 will be sufficient to hold a particular size or thickness of rod or wire 19 in firm connection with the mandrel 17, as the mandrel rotates, and in Fig. 2 we have partially illustrated in dotted lines the mandrel in a horizontal position with the corresponding position of the roller die 33.

In Fig. 2 we have also shown a plurality of straightening rollers 36 through which the rod or wire 19 passes prior to the passage of said wire between the mandrel 17 and roller die 33. It will be apparent that large coils or spools of the rod or wire 19 are employed, and in the first instance and, as hereinbefore stated, the end of the rod or wire is first passed through the straightening rollers 36, then between the roller die 33 and the mandrel 17, and said end portion of the rod or wire passed through the aperture 21 which serves to secure the end portion of the rod or wire against slipping when the machine is set in operation, or the shaft 13 rotated. As the operation of the machine continues the coils or springs 27 formed in the manner hereinbefore set out may be cut off into any desired length, or the separate loops or links may be automatically cut off immediately after the coil or spring 27 has been formed.

In Figs. 3, 4 and 5 we have shown the dies which we employ in severing the separate links from the coil or spring 27, one of the dies being a stationary die and is shown at 37 in said figures, and the other die 38 is a movable die. The die 37 consists of a main stock portion 39 which is approximately rectangular in form and on the free end of which is an enlarged portion 40, which is approximately the shape of one-half of the loop or opening of the separate link members, as clearly illustrated in Figs. 3 and 5, the top of said enlarged portion 40 being raised to a slight extent as shown at 41 to retain the coil or spring 27, or one of the loop members thereof in position. Between the enlarged portion 40 and the stock 39 of the die 37 is reduced and provided with a plano-convex portion 42 over which the innermost link or loop member 43 of the coil or spring 27 is adapted to pass.

The bottom face of the die 38 adjacent to one corner portion thereof is provided with an arc-shaped recess 44 which is adapted to register with the curved top portion 41 of the enlarged portion 40 and in the downward movement of said die as is illustrated in full lines in Fig. 5, the link or loop member 43, which is also shown in full lines in Fig. 5, is severed from the next adjacent link or loop member 45, and as the link or loop member 43 is moved downwardly by the die 38, one side portion 46 thereof passes over the part 42 of the die 37, and said side portion is bent outwardly in the manner shown in Fig. 5.

In Figs. 6 and 7 we have shown a top edge view of a part of the coil spring 27, and in Fig. 6 this coil is shown prior to its placement or passage between the dies 37 and 38, and in Fig. 7, said coil is shown after one end portion thereof has been placed between the dies 37 and 38. In Fig. 8 we have shown an edge view of one of the link members, for example, the link member 43 after it has been severed from the coil 27 and dropped into a suitable pan or other receptacle. In Fig. 9 we have shown a side view of the link member shown in Fig. 8 in which the side portion 46 is shown bent outwardly to a slight extent to form a space 47 between the end portions of the link 43 through which space another loop or link member is adapted to be passed in the formation of a chain.

In Fig. 10 we have illustrated a part of a chain and the method of connecting the separate links thereof in which operation the first link 49 of the chain, or the open ends thereof, are brought together and closed by a suitable die as shown at 50, after which another link 51 is passed through the closed link 49 by passing the link 49 through the space 47 in the link 51, after which the link 51 in the die and another link 52 are connected therewith. This operation continues until a chain of the required length has been formed, and it will be understood that in closing the separate links of a chain the opposite side portions of said links are brought together and in common alinement to form a perfectly solid link.

In Fig. 11 of the drawing, we have shown at 53, 54, 55 and 56, four link members which differ in form and construction from the links made by the apparatus shown in Figs. 1 to 5 inclusive. The link member 53 is approximately of the same general form as the link member 49 shown in Fig. 10, but the opposite side portions thereof are bent or concaved inwardly as shown at 57, while the side portions of the link shown at 54 are bent or curved outwardly as shown at 58. The link 55 is a perfectly round link, while the link 56 is approximately rectangular in form as clearly shown.

It will be understood that while we have shown a number of different forms of link members our invention is not necessarily limited thereto, as links of any desired form and construction may be made by the apparatus herein described and shown in the accompanying drawing, and in the making of the various link members the general form thereof will depend upon the form of the mandrel and roller die employed, or elements of this class designed to produce the same result. It will also be apparent that while we have shown certain details of construction in the apparatus for carrying our invention into effect, we are not necessarily limited to such details and various changes in and modifications of the construction herein shown and described may be made, within the scope of the appended claims, without departing from the spirit of our invention or sacrificing its advantages.

Having fully described our invention, what we claim as new and desire to secure by Letters Patent, is:—

1. An apparatus of the class described comprising a rotatable mandrel, a tensionally operated roller coöperating with said mandrel to form from a rod or wire fed therebetween a spiral coil, said mandrel tapering outwardly, and means movable longitudinally of said mandrel for advancing the separate windings of said coil, when formed, onto the tapered portion of said mandrel.

2. An apparatus of the class described comprising a rotatable mandrel, a tensionally operated roller coöperating with said mandrel to form from a wire fed therebetween a coil of wire, said mandrel being provided with an outwardly tapered portion, and a tensionally controlled finger adapted to advance the separate windings of said coil, when formed, onto the tapered portion of the mandrel.

In testimony that we claim the foregoing as our invention we have signed our names in presence of the subscribing witnesses this 4th day of Sept., 1919.

CHARLES ROBERTSON.
LOUIS LAUPOT.

Witnesses:
HOMER CARLTON,
E. T. KUNKLE.